United States Patent
Drees (10) Patent No.: US 7,770,068 B2
(45) Date of Patent: Aug. 3, 2010

(54) SYSTEMS AND METHODS FOR WEBSITE MONITORING AND LOAD TESTING VIA SIMULATION

(75) Inventor: Timothy Patrick Drees, Del Mar, CA (US)

(73) Assignee: Neustar, Inc., Sterling, VA (US)

( * ) Notice: Subject to any disclaimer, the term of this patent is extended or adjusted under 35 U.S.C. 154(b) by 705 days.

(21) Appl. No.: 11/142,889

(22) Filed: Jun. 1, 2005

(65) Prior Publication Data

US 2006/0276997 A1    Dec. 7, 2006

(51) Int. Cl.
*G06F 15/00* (2006.01)

(52) U.S. Cl. .......................... 714/38; 702/186; 714/47; 709/224; 709/229

(58) Field of Classification Search .................. 714/38, 714/31; 715/704; 717/124
See application file for complete search history.

(56) References Cited

U.S. PATENT DOCUMENTS

| | | | | |
|---|---|---|---|---|
| 5,758,062 | A * | 5/1998 | McMahon et al. | 714/38 |
| 6,167,534 | A * | 12/2000 | Straathof et al. | 714/38 |
| 6,263,456 | B1 * | 7/2001 | Boxall et al. | 714/31 |
| 6,452,606 | B1 * | 9/2002 | Luzzatto | 715/704 |
| 6,532,023 | B1 * | 3/2003 | Schumacher et al. | 715/704 |
| 6,587,969 | B1 * | 7/2003 | Weinberg et al. | 714/46 |
| 6,823,478 | B1 * | 11/2004 | Prologo et al. | 714/38 |
| 6,973,489 | B1 * | 12/2005 | Levy | 709/224 |
| 6,978,218 | B1 * | 12/2005 | Kolb et al. | 702/122 |
| 7,165,191 | B1 * | 1/2007 | Vakrat | 714/38 |
| 7,231,606 | B2 * | 6/2007 | Miller et al. | 715/738 |
| 2002/0063735 | A1 * | 5/2002 | Tamir et al. | 345/745 |
| 2002/0116507 | A1 * | 8/2002 | Manjure et al. | 709/229 |
| 2002/0147942 | A1 * | 10/2002 | Moe et al. | 714/38 |

(Continued)

FOREIGN PATENT DOCUMENTS

DE    10157081 A1 *  6/2003

OTHER PUBLICATIONS

Aoki, Y.et al., "Web operation recorder and player", Parallel and Distributed Systems, 2000. Proceedings. Seventh International Conference on Jul. 4-7, 2000 pp. 501-508.*

(Continued)

*Primary Examiner*—Scott T Baderman
*Assistant Examiner*—Chae Ko
(74) *Attorney, Agent, or Firm*—Procopio, Cory, Hargreaves & Savitch LLP (57) ABSTRACT

Described herein are systems and methods for website or web based application monitoring and load testing. A server is configured to execute monitoring or load testing agents on various agent devices that are placed in various locations across a network. The agents receive a playback script from the server and execute the script to simulate a user session that is part of a website monitoring or load testing project. Execution of the playback script may cause the agent to send commands to a generic browser application that in turn carries out those commands. Alternatively, or in combination, execution of the script may cause the agent to simulate operating system commands such as mouse, keyboard, and voice commands. The results of the script execution by the agent are stored and sent back to the server for potential real time alerting notification and compilation into a related report. Methods for recording the playback scripts are also provided.

18 Claims, 4 Drawing Sheets

U.S. PATENT DOCUMENTS

| | | | |
|---|---|---|---|
| 2002/0177977 A1* | 11/2002 | Scarlat et al. | 702/186 |
| 2003/0005044 A1* | 1/2003 | Miller et al. | 709/203 |
| 2003/0016248 A1* | 1/2003 | Hayes Ubillos | 345/800 |
| 2003/0217308 A1* | 11/2003 | Volkov | 714/38 |
| 2004/0003325 A1* | 1/2004 | Muller et al. | 714/38 |
| 2004/0015762 A1* | 1/2004 | Klotz et al. | 714/742 |
| 2004/0172253 A1* | 9/2004 | Singh | 704/270.1 |
| 2004/0225713 A1* | 11/2004 | Abbasi et al. | 709/203 |
| 2005/0172168 A1* | 8/2005 | Kilian | 714/31 |

OTHER PUBLICATIONS

U.S. Appl. No. 11/142,890, office action mailed Jun. 17, 2008.

* cited by examiner

SYSTEMS AND METHODS FOR WEBSITE MONITORING AND LOAD TESTING VIA SIMULATION

BACKGROUND

1. Field of the Invention

The present invention generally relates to the field of website monitoring and load testing and more particularly relates to abstract simulations of monitoring and load testing based on pre-recorded scenarios of user interactions with a browser or operating system.

2. Related Art

Conventional website or web based application monitoring and load testing is typically accomplished by using a proprietary web browser to interact with a website. In order to accomplish website transaction monitoring, which simulates a user scenario at a website (such as purchasing a good, checking a stock quote etc.), two conventional methods are used. One method involves simply replaying a sequence of predefined static GET or POST requests. This method is deficient in that replaying a sequence of static (i.e., hard-coded) requests causes a transaction to fail for dynamic sites that contain information that often changes. The second conventional method requires the use of a proprietary browser that must examine, understand, and process all of the hypertext markup language ("HTML") and Javascript that is sent to the browser for processing. For example, to simulate a simple click of the link "Men's Shirts" the browser must scan through the HTML, and look for this link:

<A HREF="http://store.com?category=2342323">Men's Shirts"</A>

These conventional proprietary browsers must be able to parse through the HTML, find the associated text and then scan all of the HTML code near the target text to pick up the uniform resource locator ("URL") to follow. This is the simplest case scenario. More sophisticated modern websites that employ dynamic hidden variables, form posts, Javascript logic, etc significantly complicate the proprietary nature of conventional solutions by requiring equally sophisticated capabilities in the proprietary browser. Some conventional solutions may also employ a combination of the two described methods.

Similarly, integrated applications that are hosted by websites are moving away from simple HTML pages to pages that involve more client-side application interpretation. Specifically new technologies such as Flash, ActiveX and Java Applets are sent to the browser to be executed in a "shell" within the browser. These integrated applications are effectively delivered to the local machine and are unrelated to the local web browser except that modern web browsers will run these integrated applications intertwined with a normal web page. For example, a Flash application might run in the upper right hand corner of a particular webpage or website, but in fact the Flash application is a discrete application that is running on the local machine. Such applications are very difficult to monitor by conventional website monitoring or load testing systems because the applications are both proprietary and delivered in a binary format.

Therefore what is needed is a system and method that overcomes these significant problems found in the conventional systems as described above.

SUMMARY

Accordingly, systems and methods for website monitoring and load testing are described herein that do not require complex proprietary solutions and that raise the level of abstraction for monitoring and load testing in order to simplify the process and make it portable to various platforms. A website monitoring and load testing server is configured to execute monitoring or load testing agents on various agent devices that are placed in various locations across a network. The agents receive a playback script from the server and execute the script to simulate a user session that is part of a website monitoring or load testing project. Execution of the playback script may cause the agent to send commands to a generic browser where the commands are carried out. Alternatively, or in combination, execution of the script may cause the agent to simulate operating system commands such as mouse, keyboard, and voice commands. The results of the script execution by the agent are recorded and sent back to the website monitoring and load testing server. In the case of website monitoring, that result is used for potential real-time alert notification, portal display and compilation into the relevant report. For the case of load testing, that result is compiled into the relevant report.

Additionally described herein are improved methods for recording website monitoring and load testing scenarios that provide the basis for the various playback scripts that are executed by an agent.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods to simulate operating system or commercial web browser interactions for the purpose of carrying out website monitoring or load testing. For example, one method as disclosed herein allows for a server to execute monitoring or load testing agents on various agent devices that are placed in various locations across a network. The agents receive a playback script from the server and execute the script to simulate a user session that is part of a website monitoring or load testing project. Execution of the playback script may cause the agent to send commands to a generic browser application that in turn carries out those commands. Alternatively, or in combination, execution of the script may cause the agent to simulate operating system commands such as mouse, keyboard, and voice commands. The results of the script execution by the agent are stored and sent back to the server for compilation into a related report. Methods for recording the playback scripts are also provided.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
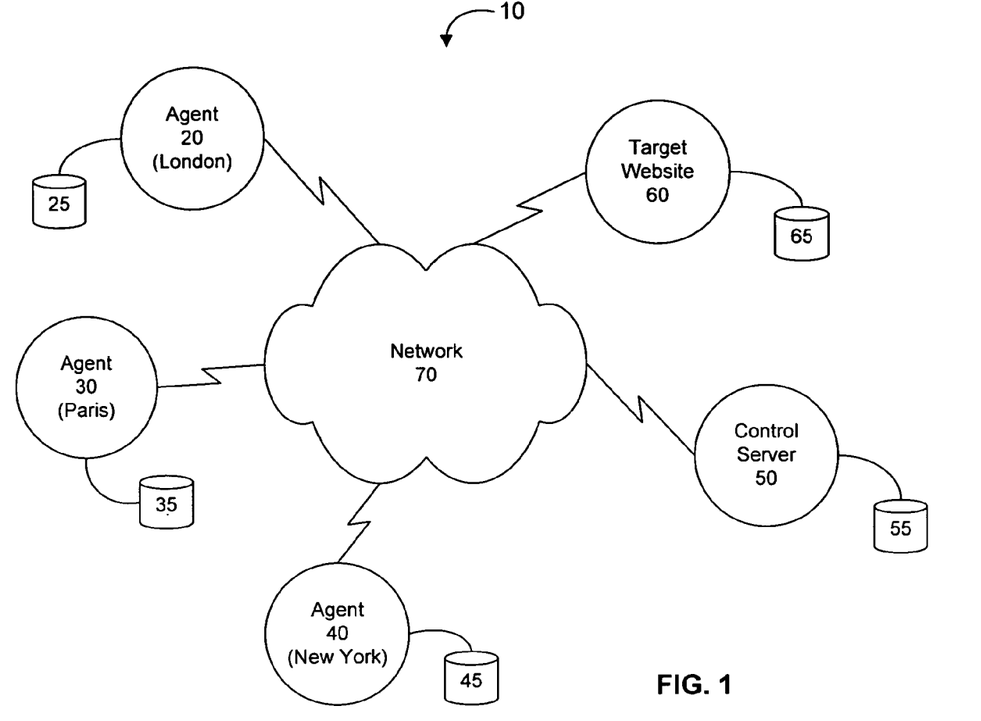
FIG. 1 is a high level network diagram illustrating an example system for website monitoring and load testing according to an embodiment of the present invention.

FIG. 1 is a high level network diagram illustrating an example system 10 for website monitoring and load testing according to an embodiment of the present invention. In the illustrated embodiment, the system 10 comprises a plurality of agents including agent 20, agent 30, and agent 40. As shown, each agent may be physically situated in a different geographic location. In one embodiment, each agent is provided with a data storage area such as the illustrated data storage areas 25, 35, and 45. Each of the various agent devices can be any sort of computing device that is capable of carrying out instructions and communicating over a network such as network 70.

Additionally, the system 10 includes a control server 50 that has a data storage area 55. The control server 50 manages the website monitoring and load testing efforts carried out by the system 10 on the target website 60. As shown in the diagram of system 10, the target website 60 has a data storage area 65 and each of the various components of the system 10 in the illustrated embodiment are communicatively coupled with each other via a network 70.

The network 70 may be any of a variety of private or public networks. The network 70 may be a packet switched network or a circuit switched network. The network 70 may be a local area network ("LAN") or a wide area network ("WAN") and may be implemented over a wired or wireless physical network medium. Network 70 may also be any combination of networks such as the ubiquitous Internet.

Figure 2:
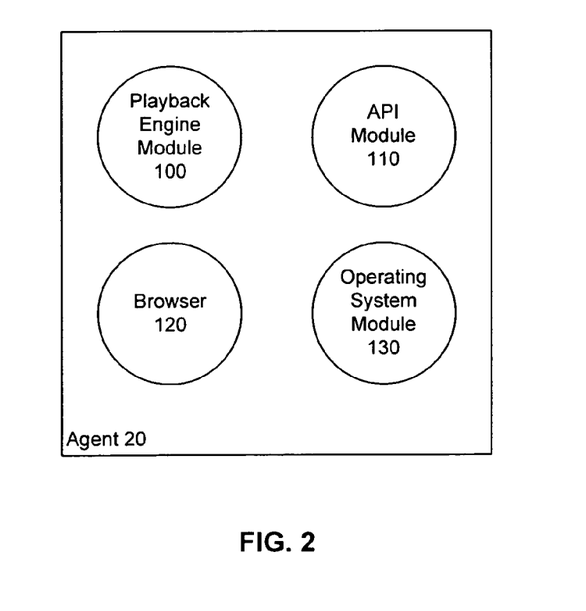
FIG. 2 is a block diagram illustrating an example agent according to an embodiment of the present invention.

FIG. 2 is a block diagram illustrating an example agent 20 according to an embodiment of the present invention. In the illustrated embodiment, the agent 20 comprises a playback engine 100, an application programming interface ("API") module 110, a web browser 120, and an operating system module 130. The API interface might be created by the browser manufacturer and be an off the shelf product or it may be an off the shelf or proprietary API developed by a third party.

In the illustrated embodiment, the playback engine module 100 is configured to execute a script of user actions that simulate a website load testing or monitoring sequence. The playback engine 100 may execute a playback script and send commands to the API module 110 or the operating system module 130. In one embodiment, the API module 110 translates a playback script command from the playback engine 100 and causes the browser 120 to take the appropriate action that is related to the particular playback script command. Alternatively, or in combination, the playback engine 100 can send commands to the operating system module 130 where the command is translated into a simulated operating system level command that in turn causes the browser 120 to take an appropriate action. For example, the action may be to move the mouse to a particular X,Y location or to enter text data.

It should be noted that the playback module 100, API module 110, and the operating system module 130 can alternatively be combined into a single module for ease of implementation. In the illustrated embodiment, these functional modules are separated out to identify the different functional aspects of one embodiment of the agent 20.

Figure 3:
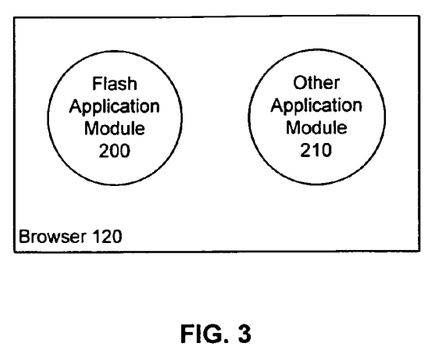
FIG. 3 is a block diagram illustrating an example web browser according to an embodiment of the present invention.

FIG. 3 is a block diagram illustrating an example web browser 120 according to an embodiment of the present invention. The browser 120 can be any sort of standard off the shelf type of browser such as Internet Explorer, Firefox, Mozilla, Netscape, Safari, or others. In the illustrated embodiment, the browser 120 comprises a flash application module 200 and an other application module 210. In one embodiment, the flash application module 200 provides the browser 120 with the ability to run flash applications that are part of a website. These flash applications can be separately executable applications that are executed by the local machine (e.g., an agent device) as part of the overall execution of the web browser 120.

The other application module 210 provides the browser 120 with a similar capability to execute other types of applications that are integrated with a website. For example, a Java applet or an ActiveX applet may be a type of other application. These types of applications may similarly be separately executable applications that are executed on the local machine as part of the overall execution of the web browser 120.

Figure 4:
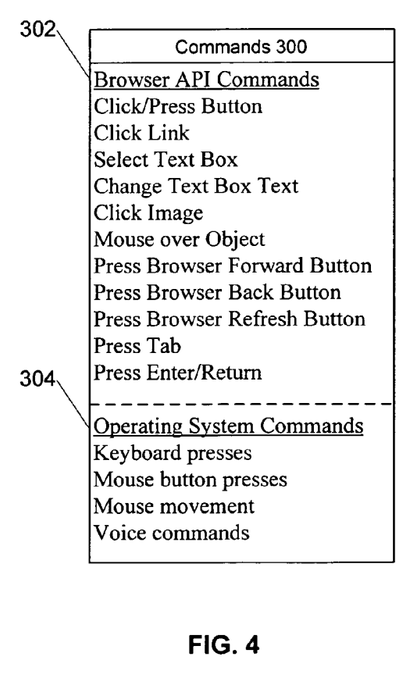
FIG. 4 is a block diagram illustrating an example set of browser API commands and operating system commands according to an embodiment of the present invention.

FIG. 4 is a block diagram illustrating an example set of commands 300 according to an embodiment of the present invention. In the illustrated embodiment, the commands 300 comprise a set of browser API commands 302 and a set of operating system commands 304. The illustrated sets of commands 302 and 304 are not exhaustive and other commands could also be included.

As shown in the illustrated embodiment, the browser API commands 302 comprise commands for clicking a link, selecting a text box, changing text in a text box, clicking an object, and pressing specific buttons that are part of the user interface of a browser. Advantageously, these types of commands can be part of a playback script that is translated by the API module when executed by an agent.

As also shown in the illustrated embodiment, the operating system commands 304 comprise system level commands for pressing a keyboard, moving a mouse, and pressing a mouse button. Additional commands can also be included, although not shown in this embodiment. In one embodiment, voice commands may be employed to effectuate the same operating system level functionality. Advantageously, operating system commands 304 can be part of a playback script that is translated by the operating system module when executed by an agent. Furthermore, the operating system commands 304 can be used in combination with the browser API commands 302 to provide a rich and complete set of commands in a playback script that are capable of carrying out all of the actions in a user session to be simulated by an agent device.

Figure 5:
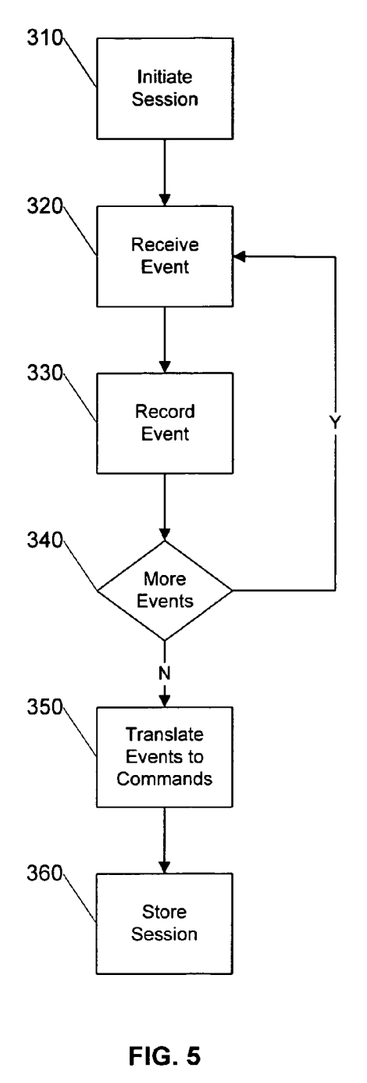
FIG. 5 is a flow diagram illustrating an example process for recording a playback session according to an embodiment of the present invention.

FIG. 5 is a flow diagram illustrating an example process for recording a playback session according to an embodiment of the present invention. In alternative embodiments, this process may be implemented by a control server or an agent device such as those previously described with respect to FIG. 1. Initially, in step 310 a recording session is initiated so that the playback session may be captured. Next, in step 320 the recording session receives an event. An event may be an operating system command or a browser command. For example, an event may be a mouse click on the "home" button of a standard web browser. An event may also be the selection of the address field in a web browser or the entry of text (e.g., a URL) into the address field.

In one embodiment, the various events can be divided into browser events and operating system events. For example, all data entry events such as typing in text and all general mouse movement events can be identified as operating system events. Additionally, all browser specific events such as pressing the "browse forward" button or "browse backward" button can be categorized as browser events. These categorizations can later be advantageous when an agent is playing back the session commands because they may assist the playback engine in routing the session command to the operating system module or the browser API module.

After an event is received, it is recorded in step 330. If more events are available, as determined in step 340, then the process returns to step 320 to receive and then record the event. In one embodiment, it may be determined that more events are available by examining the content of an event buffer that captures all user input during the recording session. If no more events are available, the recorded events are translated in step 350 into commands that are stored in step 360 as a playback session.

In one embodiment, the translated commands may identify whether the command is an operating system level command or a browser API command. As previously discussed, that designation may be advantageous for later playback at an agent device by the playback engine. In one embodiment, certain operating systems commands may include:

Os.Keypress:p
Os.Keypress:a
Os.Keypress:s
Os.Mousemovement:45,43
Os.Mousemovement:23,22
Os.Mousebutton1press Additionally, certain browser API commands may include:

Ie.gotoURL("finance.yahoo.com")
Ie.changeTextBox("symbol","MSFT")
Ie.clickButton("Go")
Ie.clickLink("Symbol Lookup")

As shown in the above example commands, a browser API command may be generally designated by a precursor (or other) field such as the "Ie" field that designates the browser as Internet Explorer. Alternatively, operating system level commands may be generally designated by a similar type of construct such as the "Os" field at the beginning of the command (or in another location).

In this fashion, actual user interactions can be recorded as operating system or browser API commands that are later executed by a playback engine to simulate a user session for use in website monitoring or website load testing.

Figure 6:
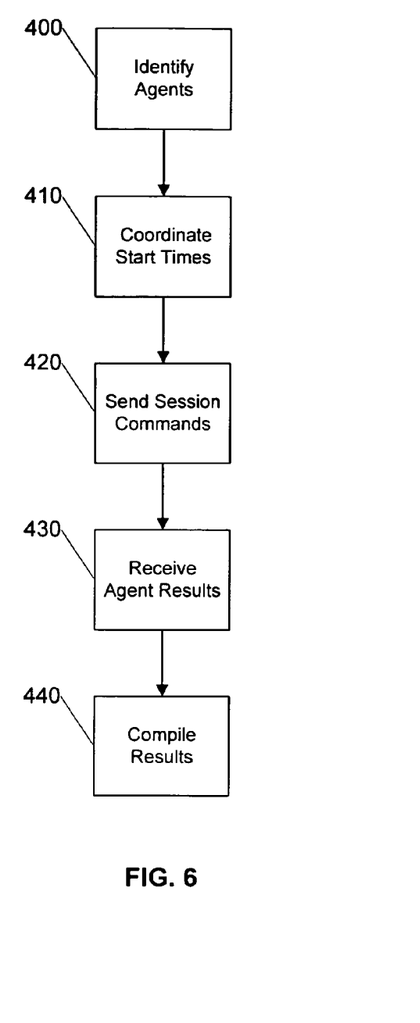
FIG. 6 is a flow diagram illustrating an example process for monitoring or load testing a website according to an embodiment of the present invention.

FIG. 6 is a flow diagram illustrating an example process for monitoring or load testing a website according to an embodiment of the present invention. This process may be implemented by a control server such as that previously described with respect to FIG. 1. Initially, in step 400 the server identifies one or more agents to be part of the website monitoring or load testing effort. These agents may be identified on one or more agent devices that are deployed on agent devices that are in communication with the server via a network. For example, the agents may be deployed in various cities around the world such as London, Paris, and New York. The agent may be a resident application on the agent device or the agent may be an application that is downloaded to the agent device for the specific purpose of the website monitoring or load testing effort.

Next, in step 410 the server coordinates the start times for each agent that is part of the website monitoring or load testing effort. For example, in a load testing embodiment, it may be important for all of the agents to start at the same time or alternatively for all of the agents to proceed sequentially. Other configuration settings may also be set up by the server prior to the execution of the website monitoring or load testing effort.

Once the website monitoring or load testing effort is set up, in step 420 the server sends the session commands to each agent. In one embodiment, the server may send each command individually and control the agent session on a command by command basis. This may be needed, for example, to implement extremely accurate timing of various commands that are sent by various agents to the website being tested. Alternatively, the server may send the entire website monitoring or load testing playback script to the agent device for execution. Various combinations of precise command by command control and total agent control can also be employed.

After an agent session ends (or during the agent session—depending on the desired implementation), the server receives the results of the testing from the agent, as shown in step 430. These results may include information such as the timing of a web page download, a more granular breakdown of the download time into, e.g., connect time, SSL time, first byte time, and transfer time. Other possible information in the results from the agent may include identification of specific content in a webpage download and various other helpful items for website monitoring or load testing.

After the results are received by the server, the results can be compiled by the server, as shown in step 440. In one embodiment, the compilation may result in a variety of reports. Additionally, the compilation may perform analysis of the results, for example, textual comparisons to validate the success of an operation or particular command. For example, text from the content of a results page, text from the title of an application being simulated, text from the title of an application running in a browser (e.g., Microsoft Word, Adobe Acrobat, Java Applet, ActiveX Applet, etc.). These textual data items in the results can be compared to a master results template to identify whether any errors occurred during the agents execution of the playback script. In the case of monitoring, real time alert notifications may be generated.

Figure 7:
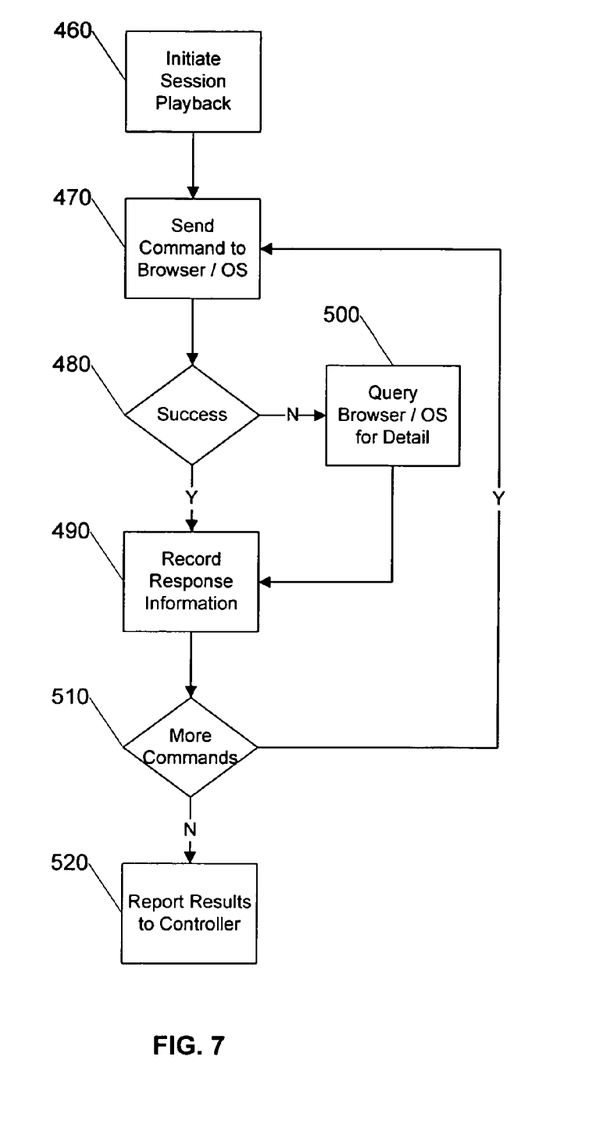
FIG. 7 is a flow diagram illustrating an example process for executing a playback session according to an embodiment of the present invention.
Figure 8:
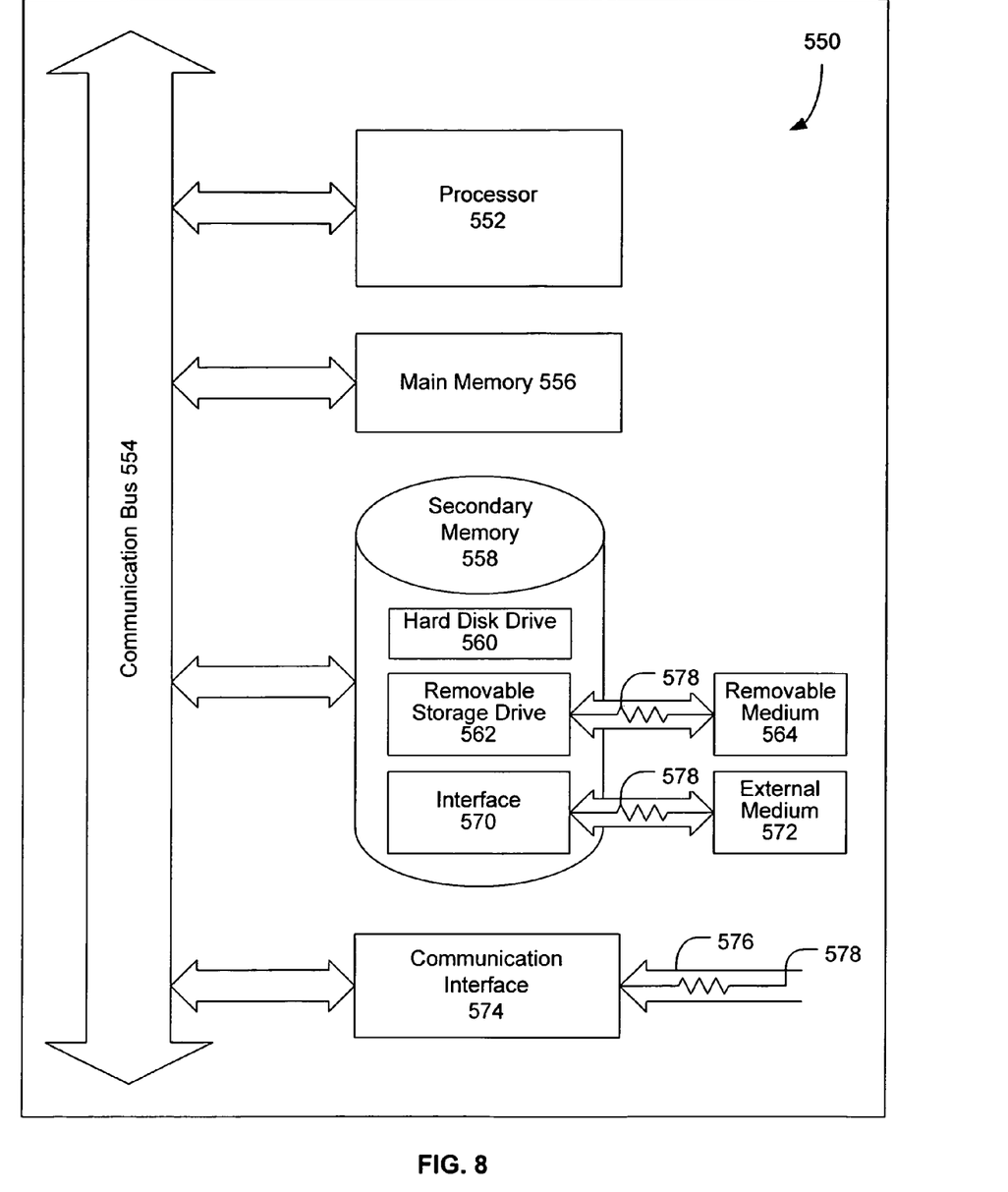
FIG. 8 is a block diagram illustrating an exemplary computer system as may be used in connection with various embodiments described herein.

FIG. 7 is a flow diagram illustrating an example process for executing a playback session according to an embodiment of the present invention. The process may be carried out by an agent device such as those previously described with respect to FIG. 1. Initially, in step 460 the agent initiates the playback session. This may be done by a playback engine, for example, which can be implemented as a software module on the agent device.

Next, in step 470 the agent sends commands from the playback script to the browser or the operating system. Commands sent directly to the browser may be routed through a browser API that is specific to the particular type of standard browser being employed (e.g., Internet Explorer, Firefox) so that the command may be translated into a command that is understood by the browser. Similarly, commands that are sent to the browser through the operating system may be routed through an operating system module for similar translation. In one embodiment, the commands sent to the operating system cause the agent device to simulate certain events (text input, mouse movements, key presses) and those events are passed to the standard browser, which is the active running application on the agent device.

If the command being sent is successful, as determined in step 480, then the response is recorded by the agent in step 490 and if there are more commands, as determined in step 510, then the process returns to step 470 for the processing of more commands. If the command is not successful, as determined in step 480, then the agent may query the browser or the operating system for information about the failure as shown in step 500. This failure information along with any response information from the unsuccessful command is also recorded by the agent in step 490. Similarly, if there are more commands, as determined in step 510, then the process returns to step 470 for the processing of more commands. If there are no more commands in the playback session, as determined in step 510, then the process may complete by reporting all of the recorded results to the controller. In alternative embodiments, the reporting of recorded results may occur in more of a real time fashion to provide the controller with dynamic feedback as to the how the website monitoring or load testing session is proceeding.

FIG. 10 is a block diagram illustrating an exemplary computer system 550 that may be used in connection with the various embodiments described herein. For example, the computer system 550 may be used in conjunction with a target website server, a control server, or an agent device as previously described with respect to FIG. 1. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A system for interactive testing of a target website from a plurality of agent devices via a communication network using simulated operating system and web browser commands, comprising:
   a plurality of agent devices communicatively coupled with a target website via a communication network;
   a controller server communicatively coupled with the plurality of agent devices via a communication network, the controller server configured to download a playback engine module to the plurality of agent devices and compile a testing result from testing information received from said plurality of agent devices;
   a plurality of playback engine modules, each playback engine module deployed on an agent device, wherein each playback engine module is configured to be executed by the agent device and carry out a sequence of instructions received from the server controller, wherein a sequence of instructions causes an agent device to interact with the target website, each playback engine module further configured to record testing information in response to the execution of said sequence of instructions and provide said testing information to said controller server.

2. The system of claim 1, wherein the sequence of instructions comprises operating system commands and web browser commands.

3. The system of claim 1, wherein a playback engine module comprises a browser module and an operating system module, wherein the browser module is configured to translate instructions from the server controller into web browser commands and the operating system module is configured to translate instructions from the server controller into operating system commands.

4. The system of claim 3, wherein the operating system commands comprise text entry.

5. The system of claim 3, wherein the operating system commands comprise keyboard input.

6. The system of claim 3, wherein the operating system commands comprise mouse input.

7. The system of claim 3, wherein the operating system commands comprise voice input.

8. A computer implemented method for interactive testing of a website through simulated operating system and web browser commands, comprising:
 identifying a plurality of agent devices accessible via a communication network;
 downloading a playback engine module to at least a portion of said identified plurality of agent devices;
 executing the playback engine module on each of said agent devices;
 providing each playback engine module with a series of commands that comprise an interactive testing session;
 instructing each playback engine module to execute said series of commands on its respective agent device, wherein execution of said series of commands causes an agent device to interact with the target website via the communication network to generate testing information;
 receiving the testing information from each of said playback engine modules; and
 compiling said testing information into testing results.

9. The method of claim 8, wherein compiling said testing information comprises comparing textual results included in said testing information to determine the success of a command in the series of commands.

10. The method of claim 8, further comprising obtaining error information from a playback engine module when a command in said series of commands fails.

11. The method of claim 8, wherein said series of commands comprise operating system commands and web browser commands.

12. The method of claim 11, wherein the operating system commands and web browser commands comprise a simulation of a user session for interactive testing of a website.

13. A computer implemented method for interactive testing of a target website through simulated operating system and web browser commands, comprising:
 identifying a plurality of agent devices, wherein each identified agent device is communicatively coupled with a target website via a communication network and wherein each identified agent device is geographically remote from the target website;
 downloading a playback engine module to said identified plurality of agent devices;
 providing each identified agent device with a series of commands that comprise an interactive testing session;
 coordinating the start time for each interactive testing session for each of the plurality of agent devices;
 instructing each identified agent device to execute its respective interactive testing session in cooperation with its respective start time to generate testing information;
 receiving testing information from at least a portion of the plurality of agent devices in response to their respective interactive testing sessions; and
 compiling said testing information into testing results.

14. The method of claim 13, wherein said providing step comprises sequentially sending individual commands to the agent device to control the timing of commands sent to the target website.

15. The method of claim 13, wherein said instructing step comprises controlling the timing of commands sent by a plurality of agents to the target website.

16. The method of claim 13, further comprising providing each identified agent device with a playback engine module configured to execute said series of commands.

17. The method of claim 8, further comprising translating one or more of said series of commands prior to execution of said translated command.

18. The method of claim 13, further comprising translating one or more of said series of commands prior to execution of said translated command as part of the interactive testing session.

* * * * *